US012682361B2

(12) United States Patent
Riffert et al.

(10) Patent No.: US 12,682,361 B2
(45) Date of Patent: Jul. 14, 2026

(54) FRAUD PREVENTION THROUGH FRICTION POINT IMPLEMENTATION

(71) Applicant: OLX Global B.V., Hoofddorp (NL)

(72) Inventors: Till Riffert, Berlin (DE); Verica Katic, Berlin (DE); Carolina Rincon, Berlin (DE)

(73) Assignee: OLX GLOBAL B.V., Hoofddorp (NL)

( * ) Notice: Subject to any disclaimer, the term of this patent is extended or adjusted under 35 U.S.C. 154(b) by 243 days.

(21) Appl. No.: 18/485,621

(22) Filed: Oct. 12, 2023

(65) Prior Publication Data

US 2024/0037572 A1 Feb. 1, 2024

Related U.S. Application Data

(63) Continuation of application No. 16/682,018, filed on Nov. 13, 2019, now Pat. No. 11,823,213.

(51) Int. Cl.
*G06Q 30/018* (2023.01)
*G06F 9/451* (2018.01)
*G06N 20/00* (2019.01)

(52) U.S. Cl.
CPC ......... *G06Q 30/0185* (2013.01); *G06F 9/451* (2018.02); *G06N 20/00* (2019.01)

(58) Field of Classification Search
CPC ........... G06Q 30/0185; G06Q 30/0609; G06Q 10/067; G06Q 20/4016; G06F 9/451; G06N 30/0609; H04W 12/06; H04L 67/535
See application file for complete search history.

(56) References Cited

U.S. PATENT DOCUMENTS

| | | | |
|---|---|---|---|
| 9,058,478 B1 | 6/2015 | Karanjkar et al. | |
| 2007/0239604 A1 | 10/2007 | O'Connell et al. | |
| 2008/0162202 A1 | 7/2008 | Khanna et al. | |
| 2009/0228340 A1 | 9/2009 | Bohannon | |
| 2009/0271514 A1 | 10/2009 | Thomas et al. | |
| 2010/0094791 A1 | 4/2010 | Miltonberger | |
| 2012/0130853 A1* | 5/2012 | Petri .................. | G06Q 30/0609 705/26.35 |
| 2013/0197998 A1 | 8/2013 | Buhrmann et al. | |

(Continued)

OTHER PUBLICATIONS

Caldeira, Evandro, Gabriel Brandao, and Adriano CM Pereira. "Fraud analysis and prevention in e-commerce transactions." 2014 9th Latin American Web Congress. IEEE, 2014.*

(Continued)

*Primary Examiner* — Sarah M Monfeldt
*Assistant Examiner* — Don Edmonds
(74) *Attorney, Agent, or Firm* — Buckley, Maschoff & Talwalkar LLC

(57) ABSTRACT

Provided are systems and methods for inserting friction points into a user session with an online resource such as a website or mobile application. In one example, the method may include receiving user data, predicting a likelihood that the user will behave inappropriately when interacting with an online resource of the host platform based on the received user data, determining a friction point in response to the predicted likelihood the user will behave inappropriately being greater than a predetermined threshold, and modifying at least one of displayed content and interactive capabilities of the online resource which are available to the user based on the determined friction point.

20 Claims, 8 Drawing Sheets

500

Receiving User Data that is Previously Stored — 510

Predicting a Likelihood that the User Will Behave Inappropriately Based on the User Data — 520

Determining a Friction Point Based on the Predicted Likelihood — 530

Modifying an Online Resource Based on the Determined Friction Point — 540

(56)                  References Cited

U.S. PATENT DOCUMENTS

| | | |
|---|---|---|
| 2014/0032751 A1 | 1/2014 | Branson |
| 2014/0222616 A1 | 8/2014 | Siemiatkowski et al. |
| 2014/0356726 A1 | 12/2014 | Han et al. |
| 2014/0358726 A1 | 12/2014 | Eakin et al. |
| 2016/0306974 A1 | 10/2016 | Turgeman et al. |
| 2016/0337286 A1 | 11/2016 | Bastide et al. |
| 2018/0091546 A1 | 3/2018 | Davidson et al. |
| 2018/0108015 A1 | 4/2018 | Rogas |
| 2018/0160309 A1 | 6/2018 | Turgeman et al. |
| 2018/0173375 A1 | 6/2018 | Webber et al. |
| 2019/0014184 A1 | 1/2019 | Yavilevich et al. |
| 2019/0065748 A1 | 2/2019 | Foster et al. |
| 2019/0108355 A1 | 4/2019 | Carson |
| 2019/0108363 A1 | 4/2019 | Caldwell |
| 2019/0205885 A1 | 7/2019 | Lim et al. |
| 2019/0220863 A1 | 7/2019 | Novick |
| 2019/0272373 A1 | 9/2019 | Sadaghiani et al. |
| 2019/0295086 A1 | 9/2019 | Ashiya et al. |
| 2019/0295088 A1* | 9/2019 | Jia .......................... G06N 5/04 |

OTHER PUBLICATIONS

892 Form dated Dec. 12, 2021 which was received in connection with U.S. Appl. No. 16/682,018.

892 Form dated Jun. 14, 2022 which was received in connection with U.S. Appl. No. 16/682,018.

892 Form dated Feb. 2, 2023 which was received in connection with U.S. Appl. No. 16/682,018.

892 Form dated Jul. 12, 2023 which was received in connection with U.S. Appl. No. 16/682,018.

Lofgren: "How to Avoid Friction Points for Your Customers"; Apr. 17, 2019.

Notice of Allowance dated Jul. 12, 2023 which was received in connection with U.S. Appl. No. 16/682,018.

European Examination Report dated Mar. 25, 2025 which was issued in a connection with European Patent Application No. 20 20 6 104. 0.

Anonymous: "Quick 'N Easy Dry ShowHide", Aug. 21, 2017 (Aug. 12, 2017), XP0932'5!8058, Retrieved from the Internet: URL:https://web.archive.org/web/20170821 022151 http:/II.VIW.I. wlillmaster.com/blog/csa/show hide-div-layer.php.

* cited by examiner

Figure 1:
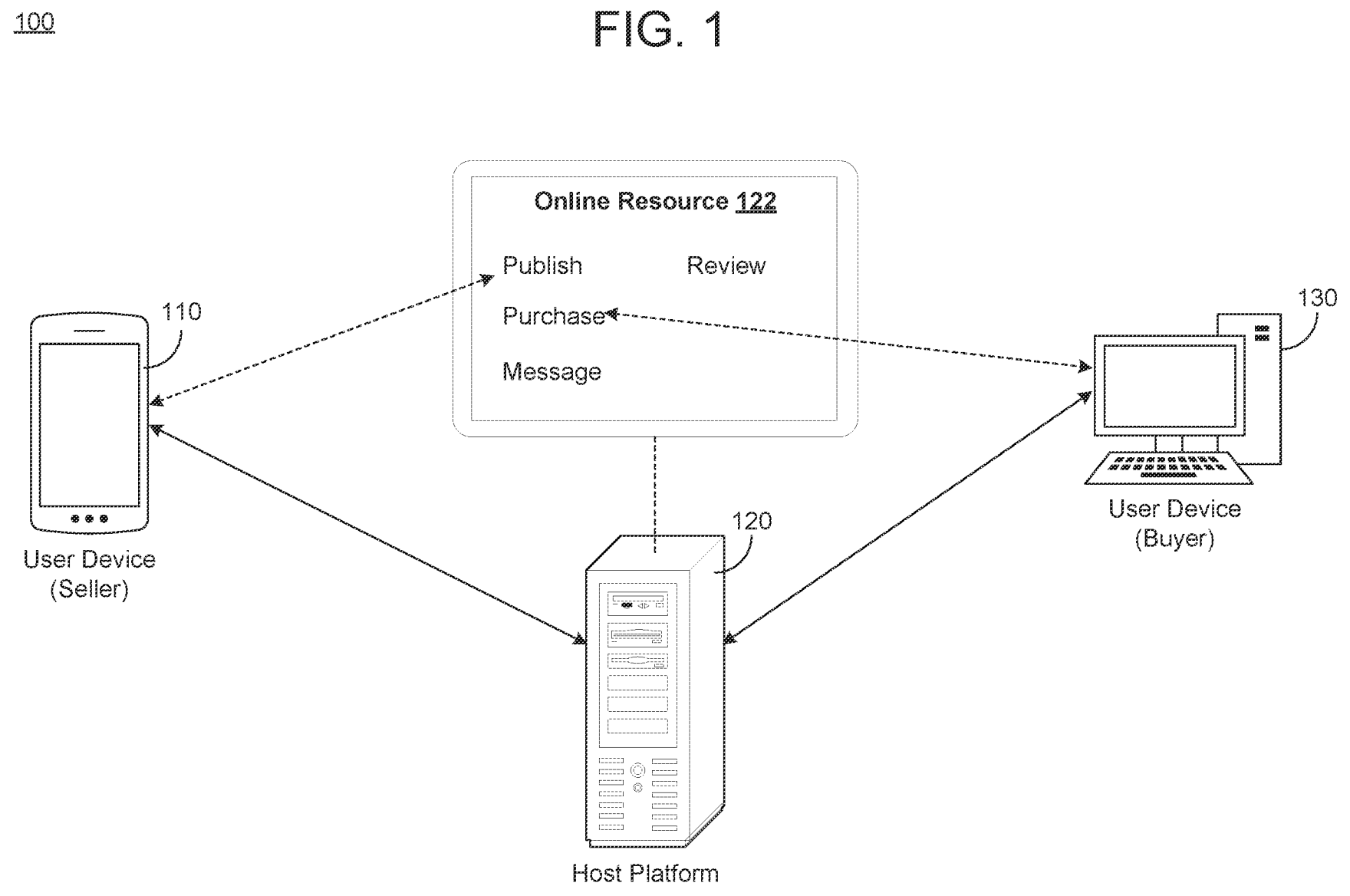

Online Resource 122

Publish          Review

Purchase

Message

130

User Device
(Buyer)

120

Host Platform

110

User Device
(Seller)

Figure 3B:
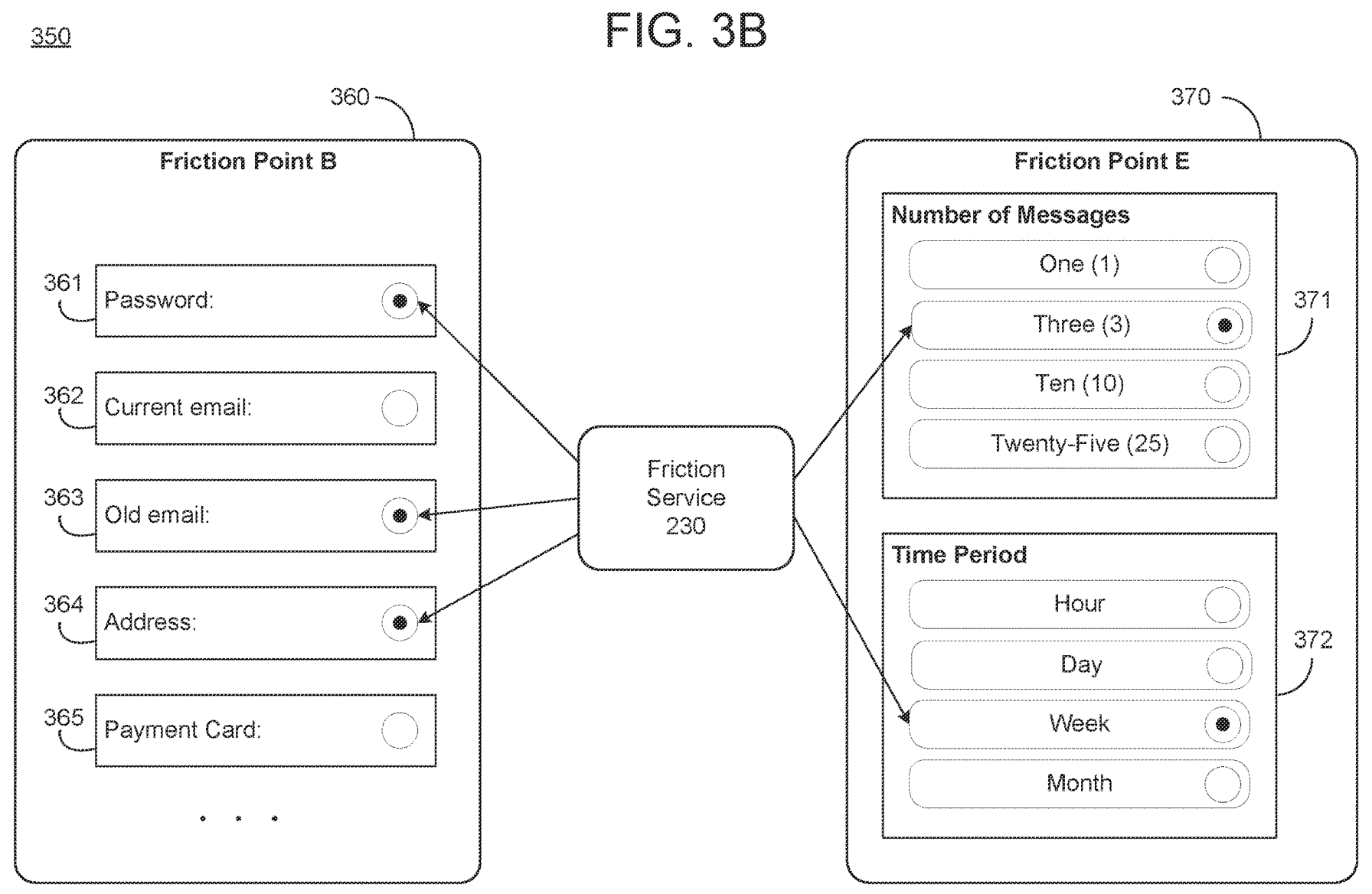

Friction Point E

371

Number of Messages

One (1)
Three (3)
Ten (10)
Twenty-Five (25)

372

Time Period

Hour
Day
Week
Month

Friction
Service
230

360

Friction Point B

361 Password:
362 Current email:
363 Old email:
364 Address:
365 Payment Card:

Figure 4:
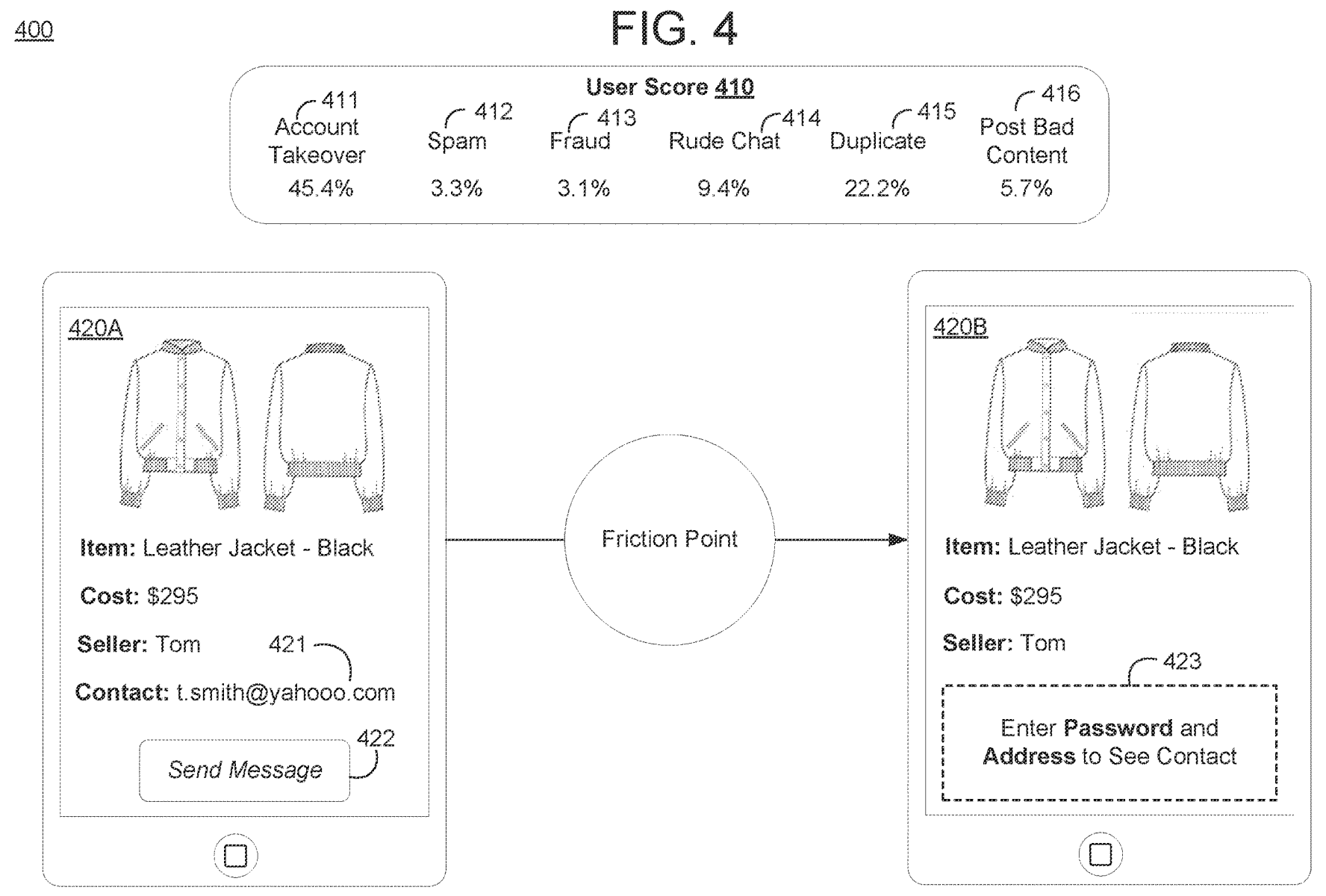

User Score 410

| 411 Account Takeover | 412 Spam | 413 Fraud | 414 Rude Chat | 415 Duplicate | 416 Post Bad Content |
|---|---|---|---|---|---|
| 45.4% | 3.3% | 3.1% | 9.4% | 22.2% | 5.7% |

420A

Item: Leather Jacket - Black

Cost: $295

Seller: Tom

Contact: t.smith@yahooo.com    421

Send Message    422

Friction Point

420B

Item: Leather Jacket - Black

Cost: $295

Seller: Tom    423

Enter Password and Address to See Contact

500

510

Receiving User Data that is Previously Stored

520

Predicting a Likelihood that the User Will Behave Inappropriately Based on the User Data

530

Determining a Friction Point Based on the Predicted Likelihood

540

Modifying an Online Resource Based on the Determined Friction Point

FRAUD PREVENTION THROUGH FRICTION POINT IMPLEMENTATION

CROSS-REFERENCE TO RELATED APPLICATION(S)

The present application is a continuation of U.S. patent application Ser. No. 16/682,018, filed on Nov. 13, 2019, in the United States Patent and Trademark Office, the entire disclosure of which is incorporated herein by reference for all purposes.

BACKGROUND

Fraudsters can use the Internet to trick users into divulging sensitive information, sending money or property, or the like. Various examples of online fraud include bot attacks, phishing attacks, social engineering, SIM swap fraud, device emulators, malware, and the like. Even seasoned users of the Internet can fall victim to fraud as new scams are being hatched regularly. The process of keeping up with new security trends and threat intelligence is a challenging task, both for platform operators and users of the services offered at these platforms.

An online marketplace enables buyers to purchase items from sellers through a website, a mobile application, a third party, or the like. Given the lack of face-to-face interaction and the relative anonymity of both the buyer and the seller, these online marketplaces can be a breeding ground for fraudulent activity. A common form of fraud is to clone or take-over a genuine seller's account with fake details and use it to con legitimate buyers into buying something they will never receive. For example, a fraudster may post an expensive item at a significantly discounted price thereby luring victims. Through this scenario, the fraudster may lure the victim to a different website steal credit card details and other personal information that the customer submits for payment. In another common form of fraud, a fraudster may create multiple fake buyer and seller accounts. The fake buyers then pay fake sellers for non-existent goods or services using stolen credit card numbers. These stolen identities are used to launder money online under the guise of online purchases until the fraud is detected and the cards are blocked.

There has been a large effort to combat marketplace fraud. However, these efforts are primarily "reactive" in nature. In other words, they are formulated after the fraud has been detected thereby giving fraudsters a head-start and time to continue to run their scams. In the online marketplace, speed for fraud detection is critical. Customers often require overnight or two-day shipping. This requires the marketplace to identify the fraud in real-time or otherwise lose the opportunity. Accordingly, a proactive system for counteracting online marketplace fraud is needed.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1 is a diagram illustrating a computing environment of an online marketplace in accordance with an example embodiment.

FIG. 3B is a diagram illustrating a process of choosing a severity of friction points in accordance with an example embodiment.

FIG. 4 is a diagram illustrating a friction point being output to the screen of a user device in accordance with an example embodiment.

Figure 2A:
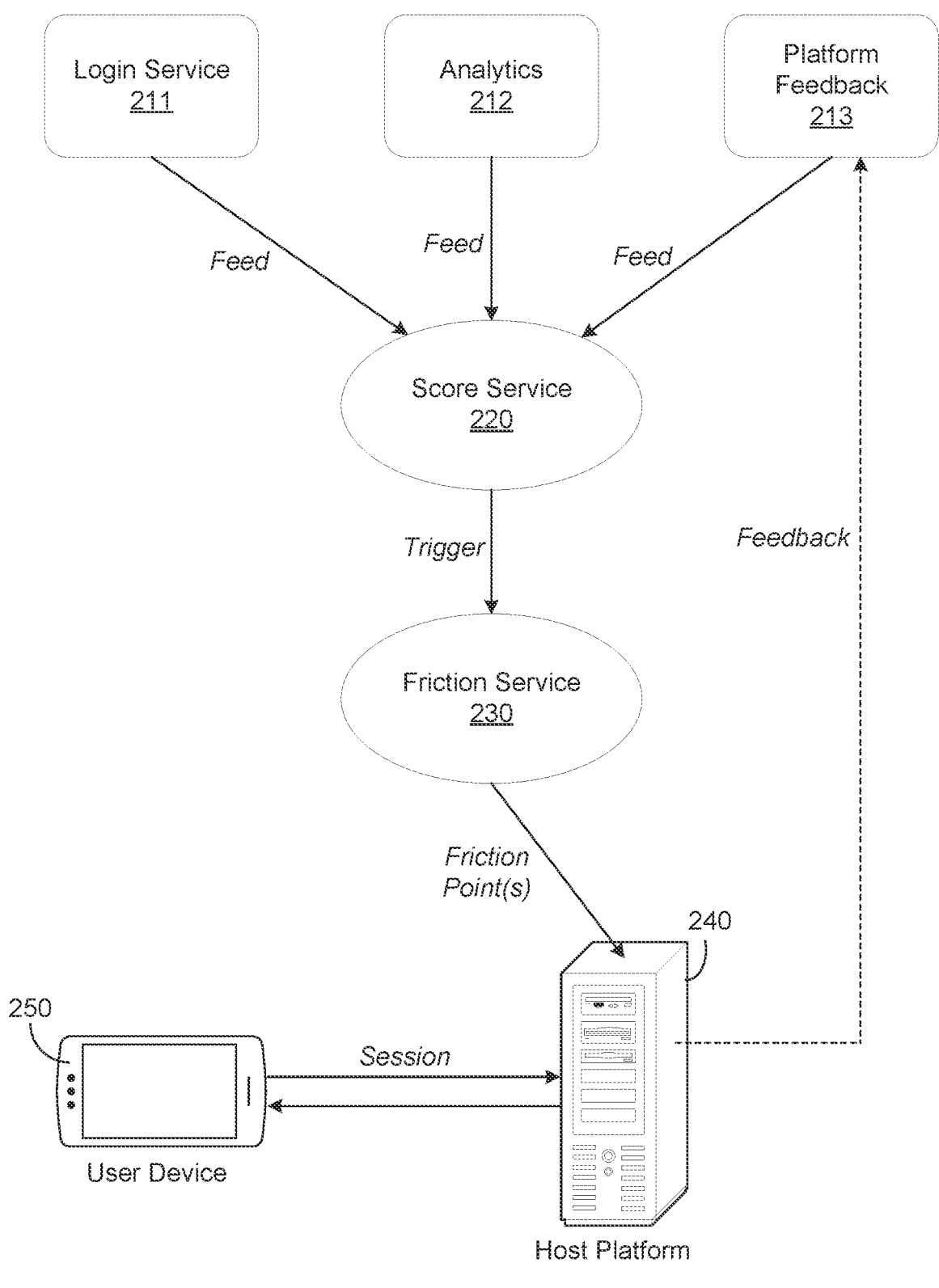
FIG. 2A is a diagram illustrating an architecture of a predictive fraud prevention system in accordance with example embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments that is shown but is to be accorded the widest scope consistent with the principles and features disclosed herein.

As the Internet continues to evolve, the selling of first and second-hand goods via commerce-based websites and mobile applications has become an increasingly popular activity. Users and/or businesses located at different geographical places may interact with each other through a common online marketplace such as a website or mobile application where sellers place their items for sale. Interested users (i.e., potential buyers) can chat, email, or even leave voice notes for sellers soliciting bids, barters, questions, posting reviews, and the like.

However, online marketplaces are often targets for fraud. For example, fraudsters may employ fake accounts in which fraudulent seller accounts may be created in bulk or account takeover where fraudsters take over seller accounts and use them to sell fictitious items. As another example, fake seller fraud occurs when fraudsters copy profiles of genuine sellers and use them to con customers. As another example, clone fraud refers to fraudsters copying genuine posts from a seller and posting it either on the same platform or other marketplace or social media to double sell. As yet another example, a group of users could be working in tandem. In general, distinguishing genuine sellers from fictitious or fraudulent sellers can be difficult. Furthermore, any delay in the buying/selling process to a genuine user may cause that user to go elsewhere.

The example embodiments are directed to a system which can combat the issue of online marketplace fraud in real-time. In particular, the system may incorporate friction points, i.e. points at which functionalities can be selectively altered to increase the amount of friction or difficulty that a user would experience during a user's session in an online resource (e.g., a website, a mobile application, etc.) In some examples, the online resource may be functioning as an online marketplace where users can buy and sell items, however embodiments are not limited thereto. The friction points provide a mechanism which can slow down fraudulent or otherwise inappropriate behavior of bad users. The friction points can protect accounts and the platform itself from the impact of nefarious users.

According to various embodiments, the system may include a central service (or group of services) which can evaluate user data such as login information, browsing history, previous posts/content, purchase history, etc., and predict whether the user will act/behave inappropriately during a session within the online resource. The prediction may be performed using machine learning models that are trained to identify different types of fraud (also referred to as inappropriate behavior). For example, the system may predict respective values/scores for each of a plurality of different types of inappropriate behavior which indicate a likelihood of the user to commit such behavior. Examples of inappropriate conduct include, but are not limited to, seller fraud, spam, account takeover, duplicate, cloning, derogatory chat, and the like.

Based on the predicted scores for the different fraud components, friction points may be triggered. The friction points may be statically provided within a session of the online resource. However, which friction points to turn on/off may be determined dynamically based on a particular user and their scores. In this case, friction point(s) may be activated depending on which negative behavior attribute is identified by the machine learning algorithms. For example, if the system predicts a strong likelihood of an account takeover, then the system may implement or require a two-factor authentication for login, and/or require that a change of email address is confirmed using an old e-mail address. If, however, the system detects a strong likelihood that the user is a spammer (i.e., someone sending mass chat messages), the friction point or points related to account takeovers may not be implemented (so the user can change their phone or e-mail address without any challenges). Instead, friction points such as limiting the posting of messages might be severely restricted.

In addition, friction points may have different severity levels enabling stronger forms of delay/restrictions and softer forms of delay/restrictions. For example, if the user's score for spam is slightly above a predefined threshold, the number of messages may be restricted for a limited duration or a limited number (e.g., 10 messages in an hour, etc.) If, on the other hand, the user's score for spam is much higher, the number of messages may be even further restricted (e.g., 3 messages in a 24 hour period, etc.). The dynamic enabling of these friction points allows the system to directly tailor the friction of the user session to a particular threat associated with the user based on previous user data. Furthermore, the friction point may slow down the user but may not completely ban the user from the site, thereby allowing the user to continue interacting with the site, though with more restrictions/limitations.

As the user continues to interact with the online resource the fraud evaluation may vary over time, e.g., get better or worse. The system may re-evaluate the user when new or different data about the user becomes available. For example, the system may predict (or recalculate) the user's score for the different negative attributes based on the newly-added data. New data may be received from the host platform that hosts the online resource where the user is interacting. As another example, new data may be received in association with an IP address or location of the user, or the like. As the user's fraud scores change, the friction points that are turned on and off, as well as the severity of the friction points may dynamically change.

FIG. 1 illustrates a computing environment 100 of an online marketplace in accordance with an example embodiment. Referring to FIG. 1, the computing environment includes a host platform 120 which hosts an online resource 122 such as a mobile application, a website, or the like. As a non-limiting example, the online resource 122 may be an online marketplace accessible via website or mobile application where users, organizations, businesses, and the like, are able to buy and sell items. In FIG. 1, a user device 110 and a user device 130 interact with each other via the online resource 122 hosted by the host platform 120. Each user device 110 and 130 may experience different user sessions. For example, the user device 110 may correspond to a seller and the user device 130 may correspond to a buyer. The buyer via user device 130 may purchase an item for sale posted by the seller via user device 110. Each session may result in different pages of the website or mobile application being loaded.

In a traditional online marketplace, once the buyer and the seller are logged into the site (or mobile app), the buyer and seller are typically permitted to use the host platform without any restrictions, unless some negative behavior is exhibited or some terms of use of the platform are violated, for example. In those instances, the traditional online marketplace has limitations in responding to this negative behavior. A possible outcome is that the platform may only have the option of banning a user from the site or allowing the user to continue to interact. This binary decision process does not provide any flexibility to monitor users and modulate their behavior. This approach also has a shortcoming of removing genuine users from the platform who might have made entries erroneously or may only occasionally exhibit some slight degree of negative behavior.

In contrast, through the predictive friction-based system described herein, a user who is deemed to be more likely to perform inappropriate activity can be delayed through the use of friction points. The friction points may be implemented by, for example, requiring additional verification to ensure that the user is a genuine user of the site and not visiting the site for nefarious purposes such as fraud, spam, a bot, or the like. As another example, the friction points may be implemented to limit or hide information from the user until further evaluation is performed and/or genuineness is proved. This process can also benefit both the system and the user by addressing the case of false positives. Instead of banning someone from the site when that person appears to be a bad actor, the friction points can be used to further evaluate the person and ensure that the user is not likely to engage in malicious behavior through a series of additional steps and/or monitorization.

In the example of FIG. 1, the host platform 120 may receive friction points from a central friction service (shown in FIG. 2A) which can identify a user, determine a likelihood of the user to commit various inappropriate activities on the online resource 122 hosted by the host platform 120, and implement friction points that correspond to the likely inappropriate activities of the particular user. The friction service may be executing on the host platform 120, or it may be a remote service that provides friction to multiple different host platforms including host platform 120. The friction points may affect either of the seller operating user device 110 and the buyer operating user device 130 to prevent or otherwise delay them from being able to conduct the transaction (or even communicate in some cases) until additional information is learned or obtained by the friction service.

Figure 2B:
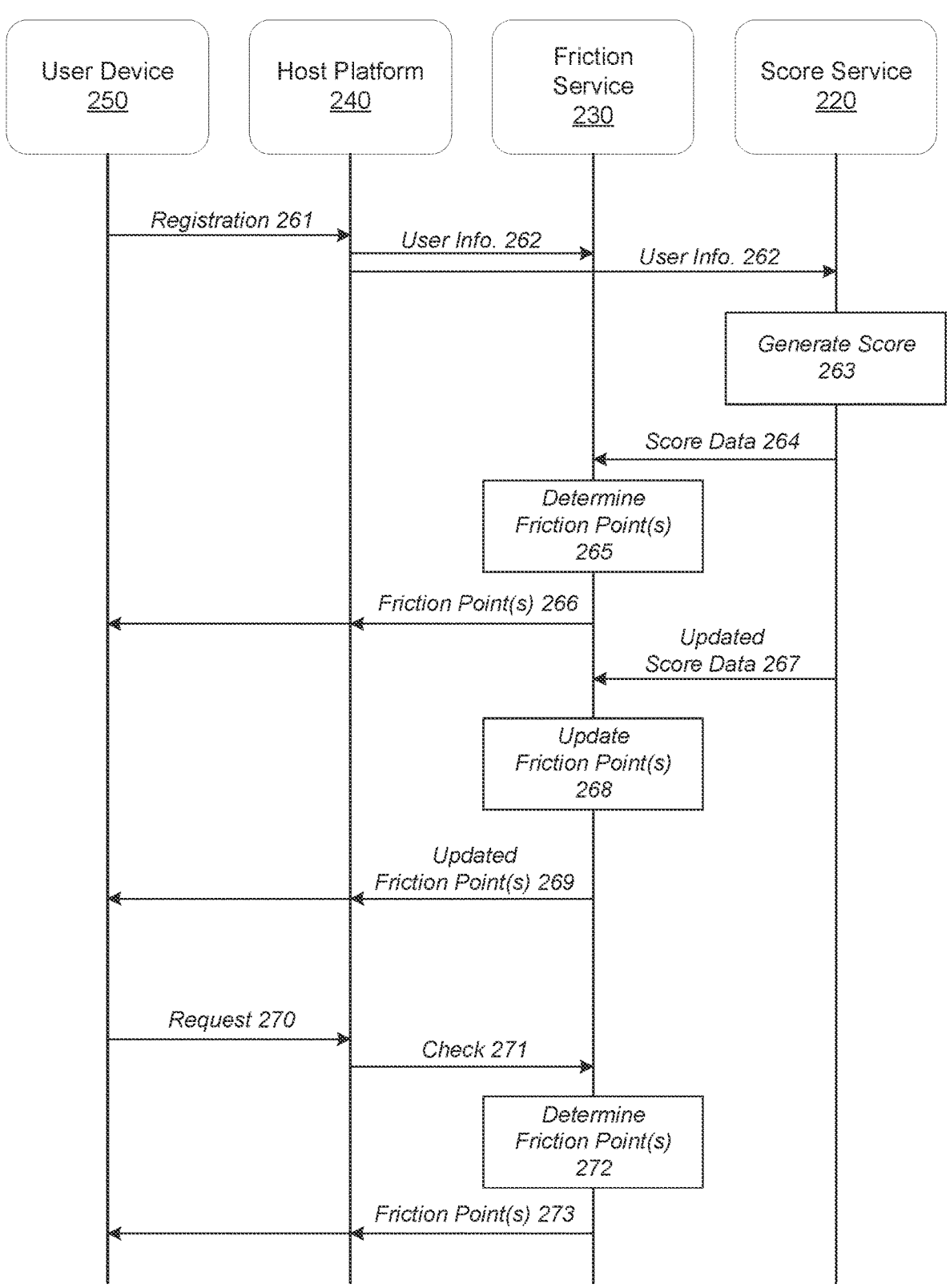
FIG. 2B is a diagram illustrating a communication sequence between components in system of FIG. 2A, in accordance with example embodiments.

FIG. 2A illustrates an architecture 200 of a predictive fraud prevention system in accordance with example embodiments, and FIG. 2B illustrates a communication sequence 260 between components in the fraud prevention system of FIG. 2A, in accordance with example embodiments. Referring to FIG. 2A, the architecture 200 includes a score service 220 that receives or is otherwise fed data from a plurality of sources. For example, the sources may include a login/authentication service 211, an analytics service 212, feedback 213 from a host platform, and the like. It should also be appreciated that other data sources not shown may be included. In these examples, the different services and feedback may capture all forms of user activity on the site including, but not limited to, which device is being used (e.g., device identifier, etc.) an IP address of the device, standard cookies files from the device, which messages are being sent by a user, which message content is being viewed by a user, what items are listed by a user, what page items the user visits and the like. The user environment is captured by the different services and the feedback. Here, the user environment refers to the environment the user is creating for themselves.

In some embodiments, a script may be embedded within the site/application of the web resource running on host platform 240. The script may capture the information about the user listed above, extract information of interest, and then provide this information in a format that is capable of being analyzed by one or more machine learning algorithms.

The score service 220 may run predictive models on the data that is aggregated from across the different data sources to create fraud predictions for a particular user indicating the likelihood of that user to commit different types of negative behavior. The predictive models may be machine learning models which are trained on historically negative behavior and user information (other users). The score service 220 builds and counts user score values for different negative attributes using different machine learning models.

The predictive models may provide a proactive approach that can accurately surface suspicious accounts and coordinated fraudulent registrations, even those still early in the incubation stage. Rather than wait for the fraud to occur and perform a reaction, the predictive models can identify patterns within the data being fed from the sources 211-213 to predict, ahead of time, when a user/account is likely to engage in some form of inappropriate conduct. Accordingly, the predictive fraud prevention system can proactively take steps to prevent such conduct from ever occurring based on the specific type of negative behavior the user is likely to commit. When the score service 220 generates a score for a particular user, the score may be a vector of different scores as shown in the example below in Table 1. Thus, a key advantage of a friction point is that an alternative to simply banning the user exists.

TABLE 1

| (User Score Vector) | |
|---|---|
| Fraud Attribute | Score |
| Account Takeover | 13.54% |
| Spammer | 1.24% |
| Seller Fraud | 43.54% |
| Rude Chat | 5.68% |
| Duplicate | 20.12% |
| Post Bad Content | 2.98% |

The friction points may be static in their nature. However, the decision on whether to switch them on or off for a given user may be dynamically performed by a friction service 230 based on a predicted fraud score of the user. The friction service 230 may understand the user scores provided from the score service 220 and translate the scores into friction recommendations which are propagated by the friction service 230 to a host platform 240 for implementation during a user session between a user device 250 and the host platform 240. For example, if the user score vector indicates a strong likelihood that the user is a spammer (i.e. someone sending mass chat messages), then the friction that is related to account takeovers may not be triggered. Instead, a friction point which restricts the posting of messages might be activated. Also, a severity of the restrictions may be determined dynamically based on the user score. The dynamics of how severely the posting is restricted lie within the friction point. For example, the friction service 230 may restrict the number of messages in an hour to 1, 3 or 30, as a nonlimiting example, based on the user's particular score. As another example, the score for each attribute may have a threshold or multiple thresholds corresponding to multiple friction points or different levels of restriction for the same friction point.

The data being fed from the sources 211-213 may include information that is captured of the user or a device (e.g., IP address, device ID, etc.) associated with the user. The user data may include browsing, posting, content, behavior, and meta (e.g. IP, geography) signals as well as the reactions to previous friction points (in order to not overdo the same friction and also reaffirm or reject a suspicion). The score service 220 may run predictive models on the data to generate at least a score per attribute. For example, supervised machine learning algorithms may be used to label data as a particular type of inappropriate behavior from among the plurality of fraud attributes. The friction service 230 may receive these scores from the score service 220 and implement friction points into a user's session with a host platform 240.

For example, the host platform 240 may host an online resource such as a website or a mobile application that provides for e-commerce/online marketplace. The user may interact with the online resource via a user device 250. Restrictions in what the user is able to access, messages the user can send, posts/ads the user can publish, reviews the user can provide, etc., can be implemented based on the user's score for the different attributes. As another example, if the user is suspected of being fraudulent or engaging in account takeover, the system may require additional login/authentication credentials of the user before they are able to perform certain activities on the online resource. In addition, messages, ads, reviews, etc., posted by a user may be provided to a moderator for review by a human.

Accordingly, rather than taking the blanket step of banning a user from the online resource, machine learning may be used to intelligently analyze user behavior and identify users that may intend to commit fraudulent behavior. Trained machine learning models can look for different fraud attributes within previous data associated with the user to generate scores. The scores are not necessarily a single user score, but a collection of multiple scores corresponding to how probable it is that a user will commit multiple different types of inappropriate behavior. Based on the different types of behavior that are identified as being associated with a user, the friction service 230 can dynamically turn on/off friction points associated with or mapped to the corresponding fraud attribute. This can slow down or otherwise delay a user from performing any negative actions on the online resource until additional security measures can be performed or the user can be monitored over time.

Referring to FIG. 2B, a communication sequence 260 between a user and the friction service 230 is shown. Here, a user device 250 may access an online resource that is hosted by the host platform 240 such as a mobile app, a website, etc. The user may register with the host platform 240 in 261 by creating an account, login credentials, providing personal information, and the like. In 262, the host platform 240 may forward the user information to the friction service 230 and the score service 220 to identify the user as a member of the host platform 240. The score service 220 may retrieve user data associated with the user device 250 (or the user thereof) from external sources such as the login service 211, the analytics service 212, and the platform feedback 213. In 263, the score service 220 may run predictive models on the user data to predict whether the user is likely to commit various respective negative behaviors such as seller fraud, account takeover, spam, negative chat, duplicate account, and the like. The result of the executing models is a collection of scores for each of the negative behavior attributes.

In 264, the score service 220 may provide the collection of scores to the friction service 230. In response, in 265, the friction service 230 may determine friction points to be added to a user experience/session with the host platform 240 based on which negative behavior attributes the user is likely to commit. Here, the friction service may asynchronously provide the friction points in 266, without a request from the host platform 240. The friction point(s) may be implemented within a user session between the user device 250 and the host platform 240 while the user is interacting with the online resource hosted by the host platform 240. For example, different friction points may be activated (e.g., such as shown in the example of FIG. 3) based on the user's scores. The likelihood of certain scores may dictate which friction points the friction service 230 activates. In addition, the friction points may have different levels of security which may be dynamically assigned based on the user's scores. Accordingly, orchestration of the friction points can be performed by a central service (e.g., the friction service 230, etc.) that manages a user's session in the online resource. In the examples provided, the friction service 230 may be positioned between the user's terminal and the online resource such that the friction service 230 may control an online resource session of the user with the online resource.

For example, through the use of dynamically assigned friction points, the friction service 230 may centrally control or change functionality available/displayed during a user's session with the online resource. In some embodiments, the friction service 230 may control or remove functionality of a website, a mobile application, etc., by removing GUI buttons, hiding information fields (e.g., telephone numbers, email addresses, etc.), and the like. The friction service 230 may control which functionality is available and which functionality is hidden through the use of tags within the source code, as further explained below. As another example, the friction service 230 may slow down a user's progress through the online resource by requiring additional verifications, authentications, etc. As another example, the friction service 230 may limit or otherwise restrict communications performed by the user via the online resource until additional information can be gathered about the user.

Over time, the score service 220 may update the scores of the user for each of the negative behavior attributes by running the predictive models again with new data added thereto. The updates may be performed periodically (e.g., once a day, once a week, etc.) or in response to a specific event (e.g., new data being received, etc.). Furthermore, in 267, the score service 220 may synchronize the updated user scores with the score data stored at the friction service 230. In 268, the friction service may update the friction points by dynamically turning different friction points on or off, or by changing a level of severity of a friction point, based on the updated score data. In 269, the friction service may implement the friction points within the user experience between the host platform 240 and the user device 250.

The examples so far have described asynchronous communications of friction points (not requested by the host platform). As another example, in 270, the host platform 240 may receive a request to access the online resource from the user device 250. In response, in 271 the host platform 240 may check with the friction service 230 for any friction points that should be applied. Here, the host platform 240 may provide an identifier of the user associated with the user device 250 such as an IP address, a username, an email address, or the like. In 272, the friction service 230 may determine friction points based on user data that is previously provided from the score service 220. As another option, the friction service may dynamically request the user data from the score service such as when the user is a new user or the user data is stale. In 273, the friction service 230 may implement the determined friction points into the user session between the user device 250 and the host platform 240.

Figure 3A:
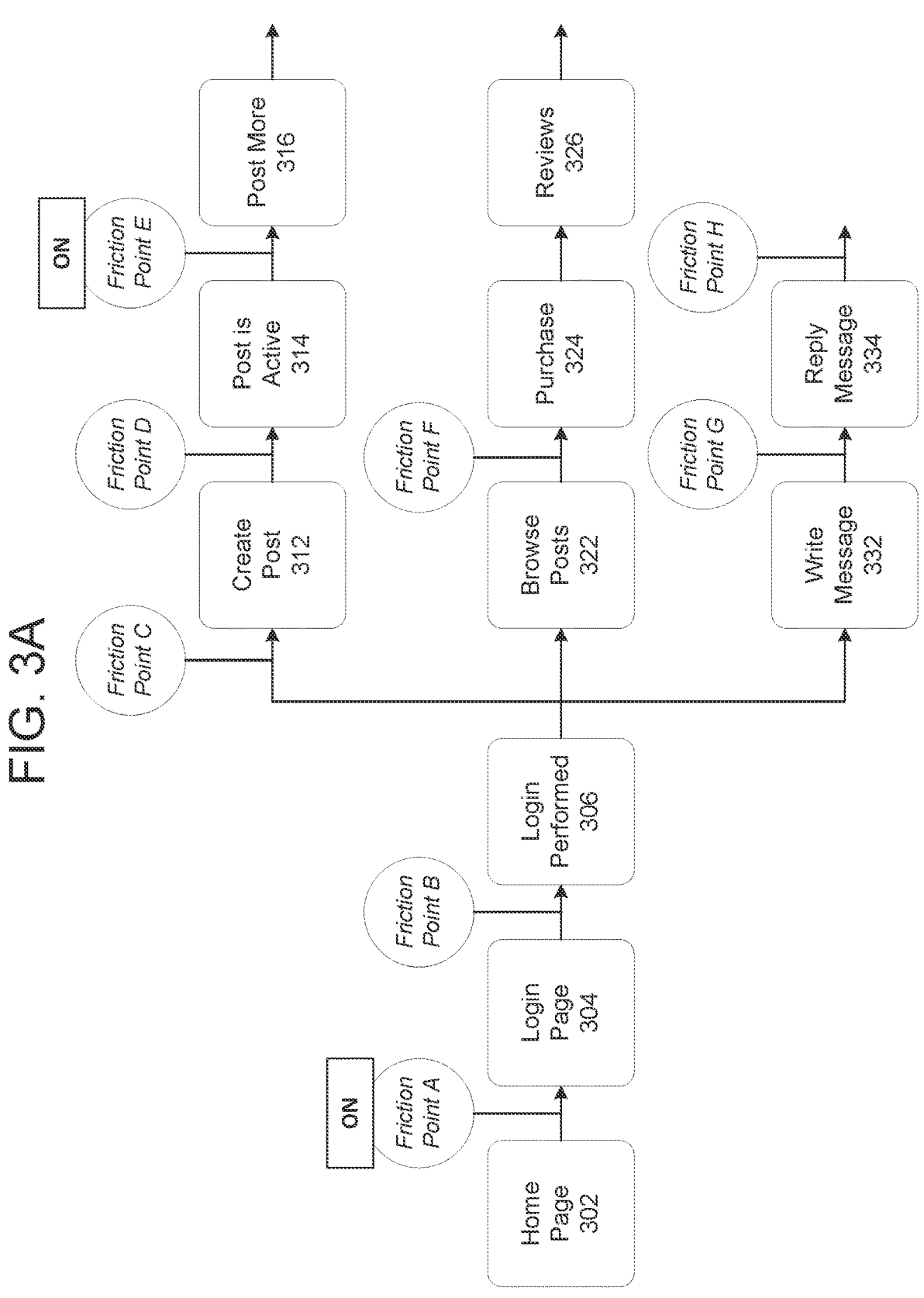
FIG. 3A is a diagram illustrating friction points that can be added within a user session in accordance with an example embodiment.

FIG. 3A illustrates examples of friction points that can be added within a user session 300 between a user device and a host platform, in accordance with an example embodiment, and FIG. 3B illustrates a process 350 of selecting a severity of two different friction points in accordance with an example embodiment. Referring to FIG. 3A, the user session 300 includes a plurality of pages such as pages in a website or pages in a mobile application which can be accessed by a user during a journey through the online resource. As the user interacts with one page, they may trigger the opening of a next page, etc. Friction points A-H may be statically inserted into the code of the online resource. However, whether to activate each of the respective friction points A-H may be dynamically determined by the friction service 230 shown in FIG. 2B.

For example, a developer may tag user action containers with an attribute such as tagging a java function with a hypertext markup language (HTML) attribute as shown below in the following code.

---

Sample Code1

```
<div id= "show_phone_number_container"
data-friction = "show_phone">
<button><button>
</div>
```

---

To implement the activating and deactivating, a developer may download and install a JavaScript library which enables the developer to configure application programming interface (API) access details of the friction service 230. For example, the library may send requests to the API of the friction service 230 to trigger the activation and deactivation (hiding and showing) of various content items on the screen of the online resource, options available to the user, limitations on message sending, ad posting, buying, etc. In the example code above, whether a phone number is visible within a web page may be enabled or disabled (i.e., hidden) using the tag.

FIG. 3A illustrates an initial login path which includes a home page 302, a login page 304 where a user may enter their credentials (username, password, etc.), and a successful login page 306 which allows the user to venture to other paths of the online resource. A first friction point A may be activated as the user traversed to the login page 304. For example, if the user is a possible account takeover, duplicate account, or the like, the friction service may activate any of the following including password challenges, password reset, a one-time code sent to a secondary device to authenticate the user, and the like. In some embodiments, the friction point A may occur when a user is forced to log out of their session such as when fraudulent or otherwise inappropriate behavior is detected by the system. As another example, a friction point B may be activated when the fraud or account takeover signal is detected. Friction point B may request that the user verify their account on a phone in their profile that hasn't been verified yet. As another example, friction point B may include a multi-factor authentication (MFA) such as when the predictive models detect fraudulent activity, unusual activity, account takeover, etc. As another example, friction point B may include an ID verification such as verifying a badge previously added to the user profile, etc.

In FIG. 3A, activated friction points include friction point B and friction point E. FIG. 3B illustrates an example of dynamically setting a severity of friction point 360 (friction point B in FIG. 3A) and friction point 370 (friction point E in FIG. 3A) based on the predicted score of the user. In the example of friction point 360, the friction service 230 may choose/select different login verification credentials to be required of the user based on how likely the user is to be a duplicate account, an account takeover, etc. In other words, the amount and type of credentials chosen may depend on the value of the fraud score predicted by the score service 220. In this example, the friction service 230 can choose between five attributes 361-365 which can each be set to create greater severity of friction, or where less than all can be set to create less severe friction.

Returning again to FIG. 3A, if the user has successfully navigated to the successful login page 306, the user may be presented with different options including the ability to post, the ability to buy, and the ability to send messages/review. In the example of posting an ad or other item, the user may access a page for creating a post 312, a page for activating the post 314, and a page for adding more posts 316. In this example, a friction point C may be implemented which

--- limits the type of postings a user can make, an ability to post, or the like. For example, if the user is predicted to be a fraudulent seller, etc. Likewise, friction point D may be triggered to send the posted ad to a moderator for review. This may occur when the user is predicted to be a fraudulent seller but the signal indicator for fraud is not that strong. Therefore, the user may be allowed to post the ad as long as it is successfully moderated. Friction point E may be inserted to limit the total number of postings/publications of ads a user can make. For example, the user may be limited in the number of postings, how many postings can be made during a predetermined period of time, or both.

Referring again to FIG. 3B, the friction service 230 may dynamically set a severity of friction point 370 (friction point E in FIG. 3A) using multiple layers of selections. Here, the friction service may dynamically set a number of messages that are allowed to be sent in box 371, and a period of time during which such messages can be sent with box 372. It should also be appreciated that the friction service 230 may prevent the user from sending any messages until additional credentials and/or verification can be performed.

Returning again to FIG. 3A, if the user has successfully navigated to the successful login page 306, the user may choose to browse ads and purchase items posted for sale within the online marketplace. The user path may include a page for browsing posts 322, a page form making a purchase 324, and a page for posting a review 326. Here, a friction point F may be activated when the user is predicted to be an account takeover, a cloned account, or the like. In this example, the friction point F may restrict the information that is shown to the user on the frontend.

An example of restricting what a user sees is shown in the example of FIG. 4. Referring to FIG. 4, a process 400 of restricting of visible content on the screen is performed. In this example, score service 220 creates a user score 410 which is provided to the friction service 230. The friction service 230 may analyze the individual scores 411-416 to identify which scores have a strong signal. In this example, the score 411 for account takeover is relatively high. Accordingly, the friction service 230 may insert a friction point into a normal page display 420A of an item for sale. In this example, the friction point may hide a contact attribute 421 and a send message button 422, and replace these content items with an additional verification button 423 as shown in the modified display 420B. The user may be required to select the verification button 423, successfully enter credentials, and go through any additional verification steps required, before the contact information is displayed. This can prevent a bot attack, a human taking over an account, or the like.

Returning again to FIG. 3A, the user may choose to navigate to a message posting path which includes a writing messages page 332 and a replying to messages page 334. In this example, friction point G may limit the total number of messages that can be submitted over a predetermined period of time. As another example, the friction point G may limit the number of ads that the user can promote, etc. As another example, friction point G may prevent user messages from ever being received (blocked) until further user verification is performed. Likewise, friction point H may limit the number of responses a user can submit and limit the amount of discoverable information about the user.

Figure 5:
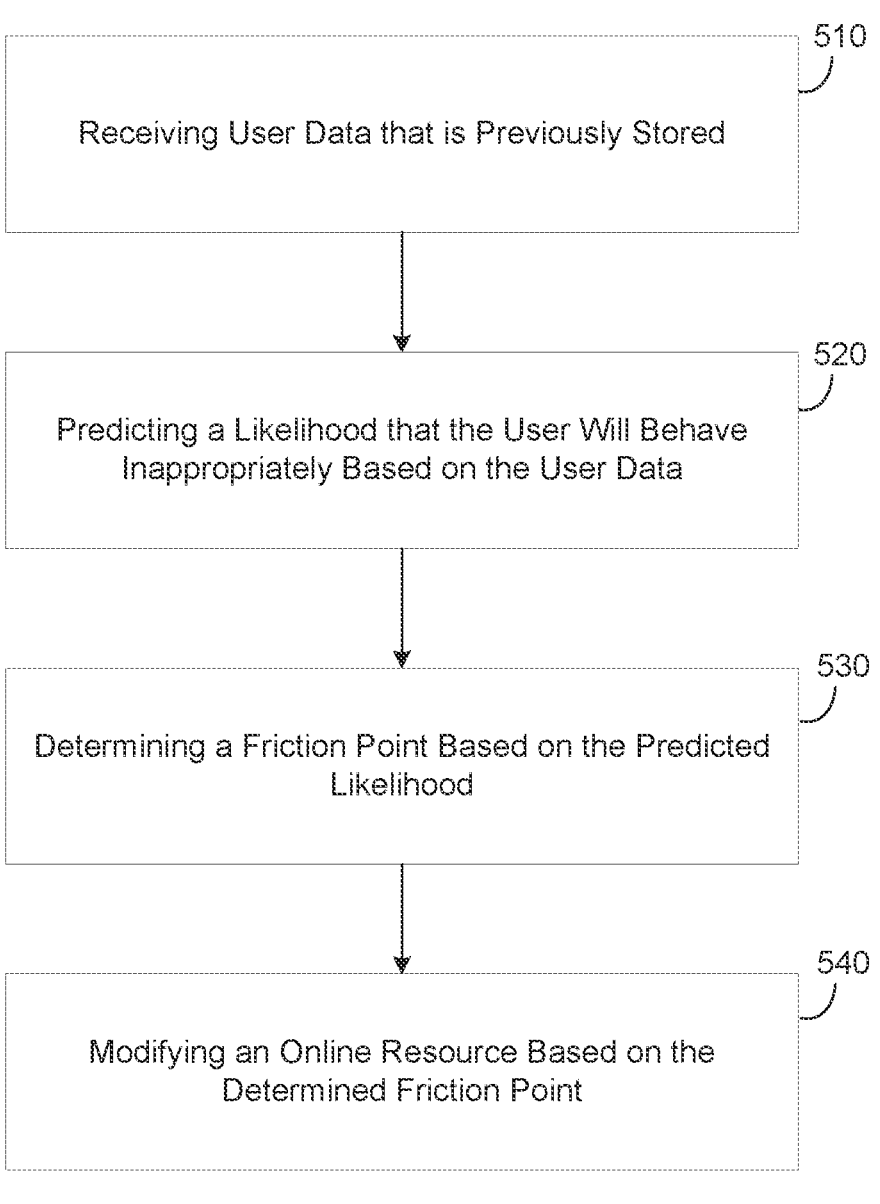
FIG. 5 is a diagram illustrating a method of implementing a friction point in accordance with example embodiments.

FIG. 5 illustrates a method 500 of implementing a friction point in accordance with example embodiments. For example, the method 500 may be performed by a web server, a host platform, a cloud platform, a database, and/or the like. In some embodiments, the method may be performed by a host platform of a mobile application or a website, however embodiments are not limited thereto.

Referring to FIG. 5, in 510, the method may include receiving user data from one or more data sources such as a login service, an analytics service, from a host platform, and the like. The user data may include browsing history, cookies information, login information, posting content, and the like. The user data may be associated with a target user of the online resource hosted by the website. The association may be determined based on a username, an IP address, a device ID (e.g., IMEI, etc.), or the like.

In 520, the method may include predicting a likelihood that the user will behave inappropriately when interacting with an online resource of the host platform based on the previously stored user data. For example, machine learning algorithms may be executed using the user data to identify whether a user exhibits various fraudulent or negative attributes such as a spammer, a seller fraud, an account takeover, a duplicate account, a negative content poster, and the like. In some embodiments, the predicting may include predicting a respective likelihood of the user to perform any of a plurality of different inappropriate behaviors while accessing the online resource based on the previously stored user data.

In 530, the method may include determining a friction point in response to the predicted likelihood the user will behave inappropriately being greater than a predetermined threshold. For example, the friction point may delay or prevent fraudulent behavior from taking place by slowing down a user's activity on the online resource. The friction point may be directly associated (e.g., mapped, paired, etc.) to the type of negative behavior which the user is likely to exhibit from among a collection of different negative behaviors. In 540, the method may include modifying at least one of displayed content and interactive capabilities of the online resource which are available to the user based on the determined friction point. For example, the modifying may include activating and/or deactivating content within the online resource (hiding or showing, etc.). As another example, the modifying may include limiting or preventing a user from taking various actions. Friction points may be activated and deactivated based on tags within code of the online resource.

In some embodiments, the determining the friction point may include activating a friction point from among a plurality of predefined friction points based on which of the different inappropriate behaviors are determined to have a likelihood greater than the predetermined threshold. In some embodiments, the modifying may include activating a friction point which limits a number of publications to the online resource the user can make, in response to the likelihood the user will behave inappropriately being greater than a predetermined threshold.

In some embodiments, the modifying may include activating a friction point which delays a posting to the online resource made by the user for a predetermined period, in response to the likelihood the user will behave inappropriately being greater than a predetermined threshold. In some embodiments, the modifying may include activating a friction point which limits a number of messages that the user can send to other users, in response to the likelihood the user will behave inappropriately being greater than a predetermined threshold. In some embodiments, the modifying may include deactivating one or more attributes of the online resource that are accessible to the user, in response to the likelihood the user will behave inappropriately being greater than a predetermined threshold.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
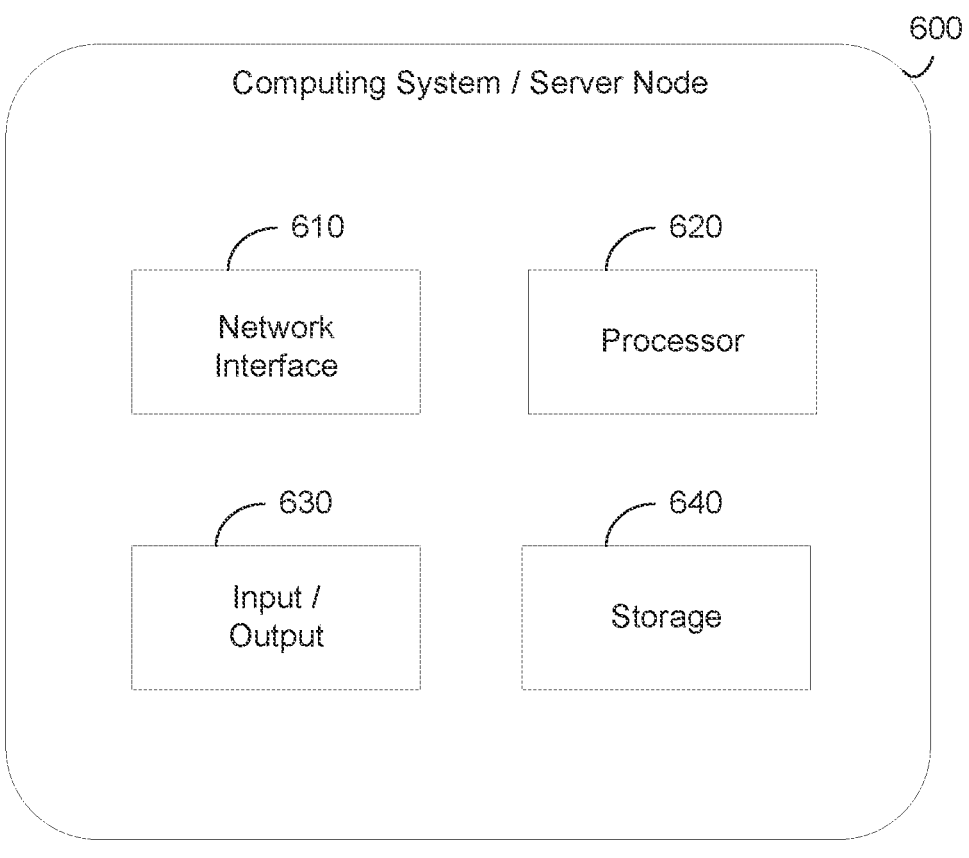
FIG. 6 is a diagram illustrating a computing system for performing the methods and processes of the example embodiments.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 6 illustrates an example computer system 600 which may represent or be integrated in any of the above-described components, etc. FIG. 6 is not intended to suggest any limitation as to the scope of use or functionality of embodiments of the application described herein. The computing system 600 is capable of being implemented and/or performing any of the functionality set forth hereinabove.

The computing system 600 may include a computer system/server, which is operational with numerous other general purpose or special purpose computing system environments or configurations. Examples of well-known computing systems, environments, and/or configurations that may be suitable for use as computing system 600 include, but are not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like. According to various embodiments described herein, the computing system 600 may be a web server.

The computing system 600 may be described in the general context of computer system-executable instructions, such as program modules, being executed by a computer system. Generally, program modules may include routines, programs, objects, components, logic, data structures, and so on that perform particular tasks or implement particular abstract data types. The computing system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computing system 600 is shown in the form of a general-purpose computing device. The components of computing system 600 may include, but are not limited to, a network interface 610, one or more processors or processing units 620, an input/output 630 which may include a port, an interface, etc., or other hardware, for inputting and/or outputting a data signal from/to another device such as a display, a printer, etc., and a storage device 640 which may include a system memory, or the like. Although not shown, the computing system 600 may also include a system bus that couples various system components including system memory to the processor 620. In some embodiments, the input/output 630 may also include a network interface.

The storage 640 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 640 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 640 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 600 may also communicate with one or more external devices such as a keyboard, a pointing device, a display, etc.; one or more devices that enable a user to interact with computer system/server; and/or any devices (e.g., network card, modem, etc.) that enable computing system 600 to communicate with one or more other computing devices. Such communication can occur via I/O interfaces. Still yet, computing system 600 can communicate with one or more networks such as a local area network (LAN), a general wide area network (WAN), and/or a public network (e.g., the Internet) via network interface 610. As depicted, network interface 610 may also include a network adapter that communicates with the other components of computing system 600 via a bus. Although not shown, other hardware and/or software components could be used in conjunction with the computing system 600. Examples include, but are not limited to: microcode, device drivers, redundant processing units, external disk drive arrays, RAID systems, tape drives, and data archival storage systems, etc.

According to various embodiments, the network interface 610 may receive user data from one or more network connected devices via a network such as the Internet, and store user data in the storage 640. As another example, the computing system 600 may store the user data that is generated locally such as feedback from a host platform, etc. The processor 620 may predict a likelihood that the user will behave inappropriately when interacting with an online resource of a host platform based on the received user data. The processor 620 may determine a friction point in response to the predicted likelihood the user will behave inappropriately being greater than a predetermined threshold. Furthermore, the processor 620 may modify at least one of displayed content and interactive capabilities of the online resource which are available to the user based on the determined friction point.

It will be readily understood that descriptions and examples herein, as generally described and illustrated in the figures, may be arranged and designed in a wide variety of different configurations. Thus, the detailed description of the embodiments is not intended to limit the scope of the application as claimed but is merely representative of selected embodiments of the application. One of ordinary skill in the art will readily understand that the above may be practiced with steps in a different order, and/or with hardware elements in configurations that are different than those which are disclosed. Therefore, although the application has been described based upon some preferred embodiments, it would be apparent to those of skill in the art that certain modifications, variations, and alternative constructions would be apparent.

What is claimed is:

1. A computing system comprising:
a network interface configured to receive user data from a device during an online session between the device and an online resource hosted by a host platform; and
a processor configured to:
display a page of the online resource from among a plurality of pages of the online resource during the online session, wherein the online resource has friction points implemented within a user experience between a host platform and user device;
predict, via a machine learning model, likelihoods of the user to commit different types of fraud when interacting with an online resource of the host platform based on the user data received from the device during the online session; and
activate a friction point in the form of a functionality that is selectively altered inside source code of the online resource during the online session to limit interaction with the online resource via the friction point or to hide the friction point in the user interface based on the predicted likelihoods of the user to commit different types of fraud.

2. The computing system of claim 1, wherein the processor is configured to predict a likelihood score of the user to commit a type of fraud and determine whether or not to activate a friction point associated with the type of fraud based on a comparison of a value of the likelihood score to a predefined threshold value associated with the type of fraud.

3. The computing system of claim 2, wherein the processor is further configured to compare the likelihood score to multiple thresholds of restriction to determine a duration that the friction point is active.

4. The computing system of claim 1, wherein the processor is further configured to receive new user data from the online resource during the online session which includes user interactions of the user with the online resource, and determine updated likelihoods of the user to commit different types of fraud when interacting with the online resource of the host platform based on the new user data received from the online resource.

5. The computing system of claim 4, wherein the processor is configured to activate a second friction point based on the updated likelihoods of the user to commit different types of fraud when interacting with the online resource.

6. The computing system of claim 4, wherein the processor is configured to deactivate the friction point inside the online resource during the online session based on the updated likelihoods of the user to commit different types of fraud.

7. The computing system of claim 1, wherein the processor is configured to hide content on a user interface of the online resource during the session based on the activated friction point inside the online resource.

8. The computing system of claim 1, wherein the processor is configured to generate and transmit a call with details about the friction point to an application programming interface (API) of a friction point activation service.

9. A method comprising:

receiving user data from a device during an online session between the device and an online resource hosted by a host platform;

displaying a page of the online resource from among a plurality of pages of the online resource during the online session, wherein the online resource has friction points implemented within a user experience between a host platform and user device;

predicting, via a machine learning model, likelihoods of the user to commit different types of fraud when interacting with an online resource of the host platform based on the user data received from the device during the online session; and activating a friction point in the form of a functionality that is selectively altered inside source code of the online resource during the online session to limit interaction with the online resource via the friction point or to hide the friction point in the user interface based on the predicted likelihoods of the user to commit different types of fraud.

10. The method of claim 9, wherein the predicting comprises predicting a likelihood score of the user to commit a type of fraud and determining whether or not to activate a friction point associated with the type of fraud based on a comparison of a value of the likelihood score to a predefined threshold value associated with the type of fraud.

11. The method of claim 10, wherein the predicting further comprises comparing the likelihood score to multiple thresholds of restriction to determine a duration that the friction point is active.

12. The method of claim 9, wherein the method further comprises receiving new user data from the online resource during the online session which includes user interactions of the user with the online resource, and determining updated likelihoods of the user to commit different types of fraud when interacting with the online resource of the host platform based on the new user data received from the online resource.

13. The method of claim 12, wherein the method further comprises activating a second friction point based on the updated likelihoods of the user to commit different types of fraud when interacting with the online resource.

14. The method of claim 12, wherein the method further comprises deactivating the friction point inside the online resource during the online session based on the updated likelihoods of the user to commit different types of fraud.

15. The method of claim 9, wherein the activating comprises hiding content on a user interface of the online resource during the session based on the activated friction point inside the online resource.

16. The method of claim 9, wherein the activating comprises generating and transmitting a call with details about the friction point to an application programming interface (API) of a friction point activation service.

17. A non-transitory computer-readable medium comprising instructions which when executed by a processor cause a computer to perform:

receiving user data from a device during an online session between the device and an online resource hosted by a host platform;

displaying a page of the online resource from among a plurality of pages of the online resource during the online session, wherein the online resource has friction points implemented within a user experience between a host platform and user device;

predicting, via a machine learning model, likelihoods of the user to commit different types of fraud when interacting with an online resource of the host platform based on the user data received from the device during the online session; and activating a friction point in the form of a functionality that is selectively altered inside source code of the online resource during the online session to limit interaction with the online resource via the friction point or to hide the friction point in the user interface based on the predicted likelihoods of the user to commit different types of fraud.

18. The non-transitory computer-readable medium of claim 17, wherein the predicting comprises predicting a likelihood score of the user to commit a type of fraud and determining whether or not to activate a friction point associated with the type of fraud based on a comparison of a value of the likelihood score to a predefined threshold value associated with the type of fraud.

19. The non-transitory computer-readable medium of claim 18, wherein the predicting further comprises comparing the likelihood score to multiple thresholds of restriction to determine a duration that the friction point is active.

20. The non-transitory computer-readable medium of claim 17, wherein the method further comprises receiving new user data from the online resource during the online session which includes user interactions of the user with the online resource, and determining updated likelihoods of the user to commit different types of fraud when interacting with the online resource of the host platform based on the new user data received from the online resource.

* * * * *